Oct. 26, 1965  A. C. CURTISS  3,213,774
PHOTOGRAPHIC FLASHGUN
Filed March 29, 1963  2 Sheets-Sheet 1
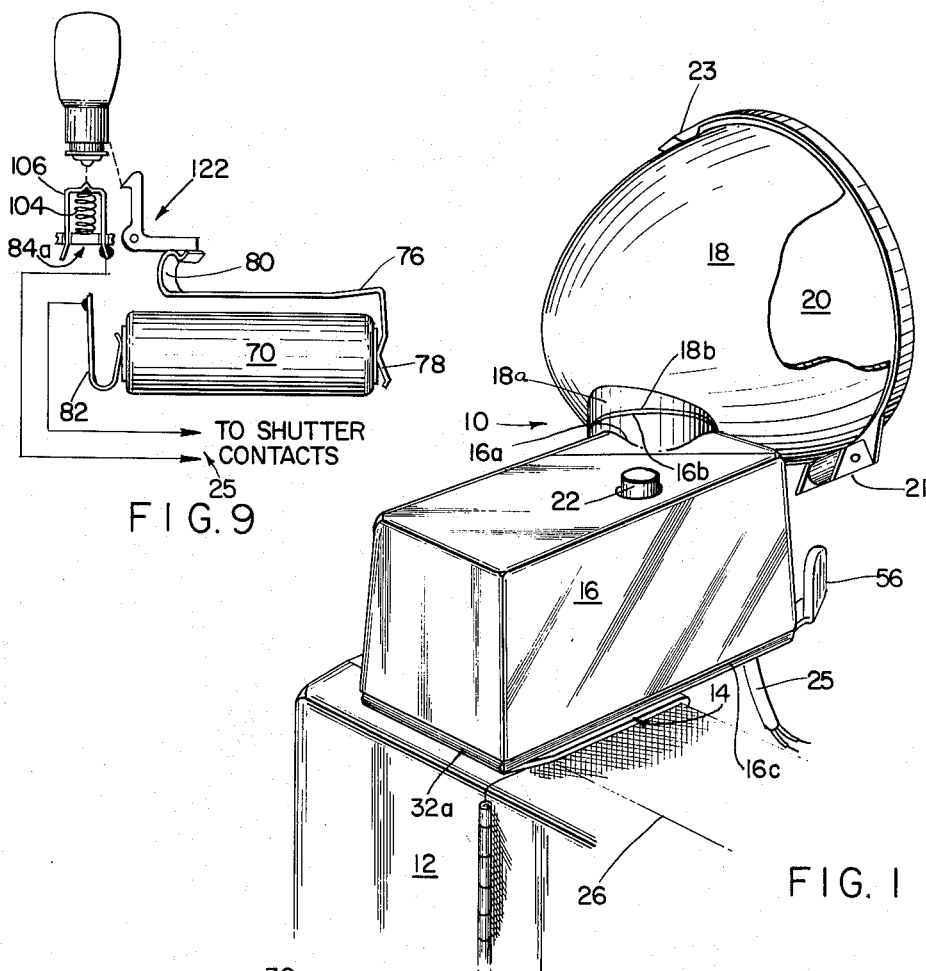
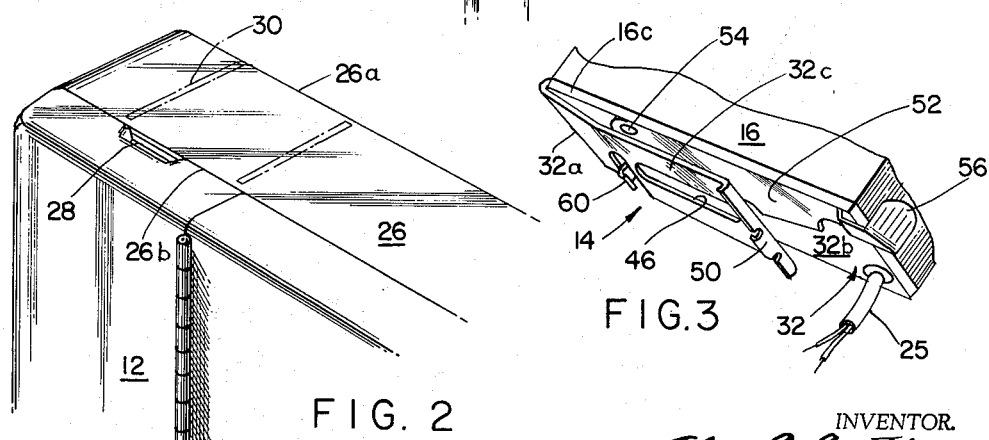
INVENTOR.
Alan C. Curtiss
BY
Geoward Mikulka
ATTORNEYS Oct. 26, 1965   A. C. CURTISS   3,213,774
PHOTOGRAPHIC FLASHGUN
Filed March 29, 1963   2 Sheets-Sheet 2

INVENTOR.
Alan C. Curtiss
BY
Brown and Mikulka
ATTORNEYS

United States Patent Office 3,213,774
Patented Oct. 26, 1965

3,213,774
PHOTOGRAPHIC FLASHGUN
Alan C. Curtiss, Cambridge, Mass., assignor to Polaroid Corporation, Cambridge, Mass., a corporation of Delaware
Filed Mar. 29, 1963, Ser. No. 268,918
12 Claims. (Cl. 95—11)

This invention relates to a photoflash unit or flashgun of a battery-containing category which includes novel means for effecting its rapid mounting and dismounting with respect to a camera and which, through other of its structural features provides a unit of a compact, relatively simple and easily operated type.

Objects of the invention are to provide a photoflash unit or flashgun which possesses an improved means for enabling its attachment to, and disengagement from a camera; to provide a flashgun having structural features contributing to its compactness; to provide a flashgun wherein a minimum number of parts are employed to perform a maximum number of functions thereby reducing maintenance problems; to provide a flashgun which can be converted instantaneously from direct to bounce flash operation; to provide a flashgun having a positive electrical connection with means leading to contact means of the camera shutter; and to provide a flashgun in which is included a shield serving both in a protective and a light-filtering capacity, especially adapted to use with a camera of a type for exposing and processing a full-color film material having given color-sensitivity characteristics.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a diagrammatic perspective view of the flashgun mounted on a camera;

FIG. 2 is a fragmentary perspective view of cooperating portions of a camera for mounting the flashgun;

FIG. 3 is a diagrammatic perspective view of the flashgun mounting bracket;

FIG. 9 is a schematic simplified wiring diagram of the flashgun.

Figure 4:
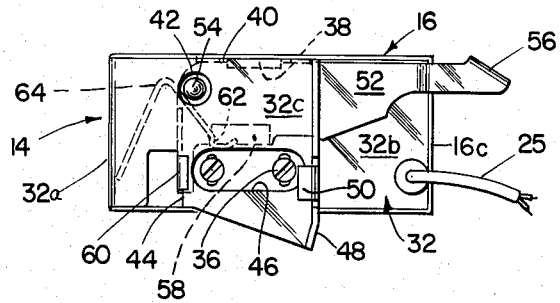
FIG. 4 is a diagrammatic view of the flashgun mounting bracket from the underside.
Figure 8:
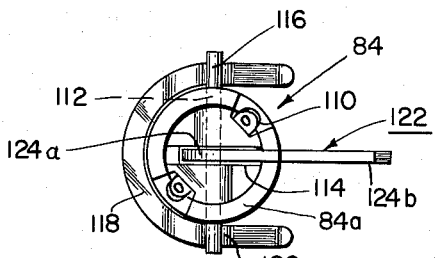
FIG. 8 is a fragmentary view of the underside of the flashgun socket and associated elements.

The flashgun of the present invention is a self-contained unit which is adapted to be firmly mounted on a camera of the character described incorporating flash synchronizing means, or to be detached therefrom, with the utmost ease and rapidity. It is usable with the camera held for either vertical or horizontal picture taking. In FIGURE 1, the flashgun 10 is shown from the rear mounted on a camera 12 through the medium of a mounting bracket 14. The flashgun includes a generally rectangular housing 16 or case, a reflector 18 rotatably attached to the housing and a transparent protective shield 20, pivotally fastened to the reflector. The reflector 18, having a slightly extended and flattened area 18a providing a planar bearing surface 18b, is of a generally parabolic configuration and is mounted on a flattened corner portion 16a of the housing comprising a planar bearing surface 16b which is acutely angled relative to the sides of housing 16. The housing 16 and reflector 18 are formed of a plastic material such, for example, as the plastic having the trade name "Implex," manufactured by Rohm & Haas Co., Philadelphia, Pennsylvania, U.S.A. The reflector 18 is formed of a similar material and is aluminized on at least its functional surface. The shield 20 is attached to the reflector by a hinge 21 and a snap latch 23. The shield is formed of a transparent, blue-tinted plastic material such, for example, as cellulose propionate and serves, additionally, in a light filtering capacity with respect to a flash lamp mounted therein. The blue wavelength transmission characteristic of the shield is so chosen as to adapt the flashgun, employing an M3 clear type of lamp, to use with an outdoor category of color film manufactured by Polaroid Corporation, Cambridge, Massachusetts, U.S.A., by subduing light of longer wavelengths. An actuating button 22 for operating a mechanism ejecting an expended flashlamp is so mounted as to project through the top of the casing 16 where it can easily be manually depressed. A two-wire cable 25 has, at its extremity, a plug, not shown, for use with connector means of the camera, the latter in turn, leading to electrical contacts for closing the flashgun circuit which are identified with the camera shutter.

A metallic, band-like portion or strip 26 of the camera housing especially formed to have the flashgun mounted thereon is shown in FIG. 2. For the purpose, the band 26 is slightly undercut along its outer or front longitudinal edge 26a. A recess 28 formed in the camera case leads under the opposite edge 26b along a short length thereof which is also slightly undercut. The positioning indicia 30, inscribed on the band 26, provides a means for rapidly locating the correct position at which the flashgun is to be mounted on the camera.

In FIGS. 3 and 4 the mounting foot or bracket 14 is shown in detail. It comprises a mounting plate 32 composed of two sections, an inner and an outer section, interconnected by a rolled-over edge 32a. The inner section 32b is fastened to a supporting bracket 34, fixedly mounted within the housing 16, by the screws 36, and the outer section 32c is adapted to be mounted on the aforesaid undercut band 26 of the camera housing. The inner plate section 32b also serves as a closure for the housing and fits within the edges 16c of the latter so as to be substantially flush therewith and held firmly in place. The inner plate section 32b is essentially a rectangular flat plate having perforations for acceptance of the aforesaid screws 36 and cable 25, and having a projecting lug 38 for insertion in a slot 40 of the supporting bracket 34. The outer plate section 32c, is of a shorter length than the inner section, has a flared extremity 48, and includes cut-out portions 42, 44 and 46 the latter aperture 46 providing access to the mounting screws 36. The flared edge 48 is turned outwardly to firmly engage the edge 26a of the camera. An outwardly extending flange element 50 is adapted to be inserted under the aforesaid undercut formation of edge 26a.

A specially formed lever element 52 is rotatably mounted on the inner plate section 32b by a pivot pin 54, visible through the perforation 42 and extends substantially across said section. The lever includes a handle 56, a box-like, centrally-located flange member 58 in slidable contact with the inner facing surfaces of the plate sections 32b and 32c and a slightly overturned flange member 60 located at an extremity of the lever extending outwardly through and beyond the slot 44. The overturned portions of flanges 50 and 60, which are inserted within the undercut portions of the band 26 of the camera, lie in a plane substantially parallel with the plane of the inner plate section 32b. A small notch 62 is formed in an edge of the flange 58. A V-shaped spring 64 is mounted between the inner and outer plate sections, 32b and 32c with its arms so compressed as to bear divergingly, against the inner surface of the rolled-over edge 32a and the notched portion 62 of the flange 58. The divergent bias of the spring causes the lever to rotate to its maximum counterclockwise position, as shown in FIG. 4, the edge of the slot 44 serving as a limit stop relative to the flange 60 in determining the rotational position of the lever. By depressing the lever handle 56, in a clockwise direction, again referring to FIG. 4, against the applied bias of spring 64, the flange 60 is moved away from the edge of slot 44 with which it has been in contact until it contacts the opposite edge of the slot 44, it being noted that in so doing it also moves away from the fixed flange 50. This enables the flange 50 to be easily inserted under the edge 26a of band 26 of the camera. When the lever handle 56 is partially released, the spring 64 again assumes control, and causes the flange 60 to move toward flange 50. Flange 60 is inserted under the edge 26b of the band 26 at recess 28. The flashgun is thus firmly mounted on the camera with the flanges 50 and 60 gripping the band edges and the portion of section 32c, intermediate of the flanges resting on the flat surface of the band. To dismount the flashgun the lever handle 56 is merely depressed and the flashgun lifted off of the camera in an outward and slightly sideways movement.

Figure 5:
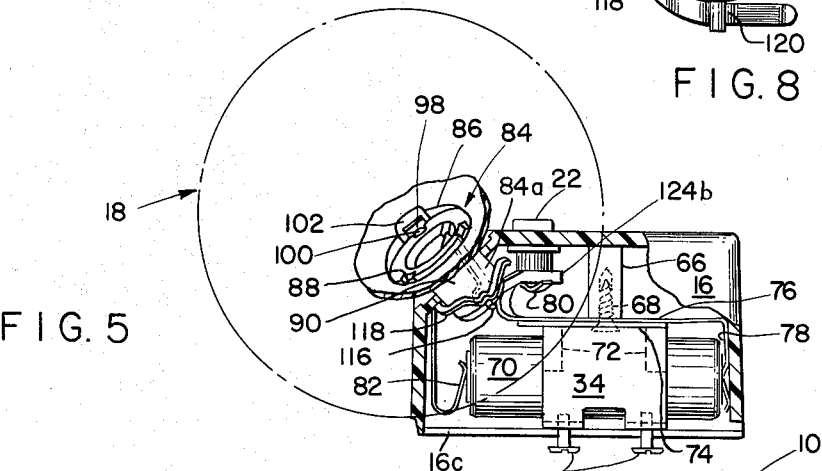
FIG. 5 is a diagrammatic side view of the flashgun assembly, with parts broken away.
Figure 7:
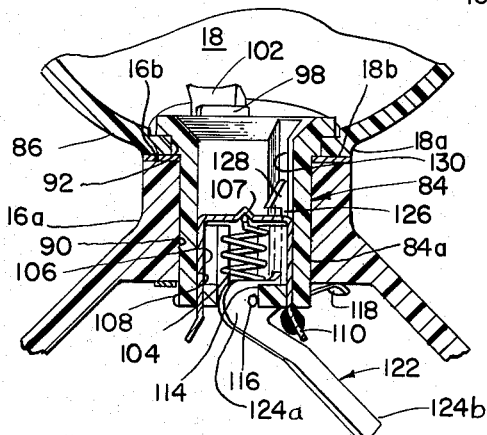
FIG. 7 is a diagrammatic cross-sectional view of a tubular element of the flashgun including a lamp socket and associated elements, taken along the line 7—7 of FIG. 6.
Figure 6:
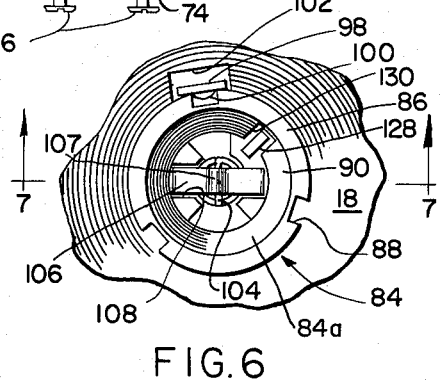
FIG. 6 is a diagrammatic, fragmentary, plan view of the flashgun socket and associated elements.

Referring to FIG. 5 the interior of the housing is shown from the side at which the angled housing portion 16a, mounting the reflector 18 extends. The supporting bracket 34 is attached by two transversely located screws 68 to a pair of threaded posts 66 extending from and integral with an inner surface of the housing 16. A battery 70 is mounted within the housing, being partially held in position by a pair of angularly-extending finger members 72 of the bracket 34. Between the mounting bracket 34 and the mounting posts 66 is a compressible gasket 74 formed of a cardboard, a fibre composition, or the like, and a metallic plate 76, the latter being composed of a spring stock such as phosphor bronze or some other resilient material, nickel or silver plated as may be advisable to resist corrosion, and having an appendage 78 for holding and providing an electrical connection with one end, e.g., the minus terminal, of the battery 70 and a second appendage 80 constituting both a biasing spring and an electrical connecting means leading to a flashlamp, as described below. The other, or plus terminal of the battery is contacted by a spring-metal clip 82 to which one wire of cable 25 is connected.

The circular tubular member 84 comprising therewithin a socket 84a for mounting a flash unit bulb or lamp, and associated elements will now be described. The member 84, comprising the socket 84a, is of a modified bayonet type and is suitably composed of a plastic material such as that having the trade name "Celcon," manufactured by Celanese Polymer Co., Newark, New Jersey, U.S.A. It comprises an upper, enlarged, circular flanged portion 86 having three indentions 88 formed around the periphery thereof at given locations, e.g., at equally spaced locations, and a tubular depending portion 90 of smaller diameter. The latter is inserted through an aperture 92 formed in the reflector and, thence through an aperture 94 formed in the housing portion 16a. It is held fixed against rotation in the latter by key and slot means, not shown. The depending tubular portion 90 is fitted somewhat loosely in the aperture 92 of the reflector to permit the latter to be rotated freely thereabout. Inasmuch as the depending tubular portion 90 of the socket is, of course, of a smaller diameter than that of the facing planar surfaces 16b and 18b of the extended portions 16a and 18a of the housing and reflector, suitable bearing areas of each are provided surrounding the apertures at the interface. A spring gasket or washer 96, composed of a resilient metal, e.g., of a nickel plated spring steel, and having an aperture formed therein for insertion of the socket portion 90 therethrough, is positioned between the aforesaid facing planar surfaces of the portions 16a and 18a of the housing and reflector, respectively. A narrow, resilient flange 98, integral with the gasket, extends upwardly therefrom at approximately 90° to the gasket surface. Near its extremity is a rounded protuberance 100. The flange 98 is mounted at recess 102 in the reflector wall for unimpeded movement in and out of the socket and constitutes a detent means which is moved bodily with the reflector, when the latter is rotated, and is adapted to engage the aforementioned indentions 88 formed in the flange 86 of the socket to position the reflector at given rotational locations for direct flash, and for bounce flash when directed overhead or to the side. It will be understood that the reflector can, if desired, also be positioned intermediately of the positions determined by the detent means.

Within the central aperture of the socket 84a is mounted a spiral compression spring 104 bearing on the base of the socket. Capping the spring 104 is a U-shaped strip-like element 106 having a central V portion 107 within which the upper end of the spring bears and which serves as an electrical contact for the center terminal of a flash lamp when inserted in the socket. The spring 104 also provides the force necessary for ejecting an expended flashlamp. The extremities of the U-shaped strip element 106 extend downwardly and slidably through appropriate apertures 108 formed in the socket base so as to project beyond the base. The U-shaped element 106 is thus permitted slidable movement, downwardly, or upwardly, in accordance with the insertion or removal of a flash lamp providing the extension or compression of the spring. At the end of one of the extremities of element 106 is an enlarged portion 110 to which one of the wires of cable 25 is attached. The portion 110 when in contact with the socket base, also serves as a limit stop to hold the U-shaped element within the socket at a given location under the bias applied by the spring 104.

At the base of the depending tubular element 84 which projects well within the housing 16, an aperture 112 is so formed as to extend diametrically therethrough. The socket is held firmly mounted in the housing 16 by a semi-circular or modified C-shaped spring member 118 which bears on one side against the inner wall of the housing. At its other side, the spring member has a pair of projecting portions 120 which bear against the extremities of a pin member 116, mounted in the aperture 112 and projecting from the ends thereof, thus drawing the entire tubular member 84 to its maximum inward mounting position. At the same time, the surface of the reflector portion 18a, with the spring gasket 96 attached thereto, is drawn toward the face of the housing portion 16a. A certain desirable frictional or damping effect is thereby produced relative to rotation of the reflector.

A lever-like element 122 in the form of a bell-crank has one arm 124 thereof rotatably mounted at one end 124a on the central portion of the pin member 116, as permitted by the transverse slot 114 which exposes the pin. At its other end 124b, the arm 124 is biased by contact with the spring 80 so as to apply thrust against the inner end of the flashbulb release button 22, thus pushing the button to its maximum outward position. A second angularly disposed arm 126 of the bell-crank element 122 has an enlarged hook-shaped extremity 128. This arm 126 extends upwardly through a narrow, rectangular slot 130 formed in the wall of the tubular member 84. The arm 126 is free to move in the slot 130. The hooked extremity 128 is thereby adapted to engage a projection of the lamp base, when the latter is properly inserted in the socket. The engaging position of the extremity 128 is brought about by the aforesaid bias applied by spring 80 to the end 124b of the arm 124. This applied bias causes the aforesaid hooked end 128 to move bodily from the slot 130 to a position slightly protruding within the aperture of the socket 84a at which position it is adapted to engage a cooperating member of the lamp base for retaining a flashlamp therein. When the button 22 is manually depressed, against the aforementioned applied bias, the hooked end 128 is withdrawn from its position engaging the base of the lamp to its recessed position in the slot 130 and the lamp is released and ejected under the impetus of the expanding compression spring 104. The shield 20 may, optionally, be at either open or closed position during ejection of the flashlamp. The schematic diagram of FIG. 9 illustrates the electrical connections within the flashgun unit and is self-explanatory.

The flashgun of the present invention, by means of the flattened corner of the case and associated mounting means for the reflector provides an extremely compact unit. The plural operations of individual components, enable the employment of a minimum number of elements in the overall structure and effect a simplicity of operation. Thus, by way of example, the resilient strip element 76 serves many purposes, namely, as a battery contact means, as a spring applying bias, respectively, to the bell-crank arm 124, to the actuating button 22, and to the hooked extremity 128 of the bell-crank arm 126, and as an electrical connecting means between the bell-crank 122 and the battery terminal at 78. The pin member 116 serves as a pivotal mounting means for the bell-crank 122 and as a bearing means for receiving the divergent force of the spring 118, thereby drawing the socket 84 to its maximum depth of insertion in the housing portion 16a and, accordingly, as an intermediary in damping the rotational movement of the reflector. The bell-crank 122 and U-shaped strip element 106 serve both mechanical and electrical functions, as hereinbefore described. The entire unit is light in weight but of rugged construction. It is easily mounted on, or dismounted from the camera by means of the novel lever-type mounting bracket 14.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic flashgun adapted to be detachably mounted on a camera, said flashgun comprising a generally rectangular housing, a bracket attached to the base of said housing for releasably mounting said flashgun on said camera, means providing a flattened corner of said housing remote from said base thereby to contribute to the compactness of said flashgun and provide a first planar bearing surface, a circular aperture formed in said surface, a concave reflector, means providing a flattened area of said reflector forming a second planar bearing surface, a circular aperture formed in said second surface, tubular means comprising a flashlamp socket having a flanged upper portion and a smaller depending portion joining together said first and second bearing surfaces, said depending portion of said tubular means being slidably inserted through both said surface apertures and said flattened reflector area being rotatable thereon, the lower extremity of said tubular means extending within said housing, spring means divergingly bearing against an inner surface of said housing and said lower extremity of said tubular means so as to draw said flanged portion firmly against the inner surface of said reflector, detent means embodied partly in means of said reflector and partly in said flanged portion of said tubular means for providing given rotational positions of said reflector, means for manually ejecting an expended flashlamp from said socket, and means within said housing for mounting a battery and providing thereby energization of said flashlamp, responsive to the closing of electrical contacts of said camera, said mounting bracket being composed of a first rectangular plate section attached to supporting means within the base of said housing, a second smaller plate section having a flared extremity and a slot formed therein attached to said first section in underlying spaced relation thereto and also having a downwardly projecting fixed flange at a transverse extremity for engaging an external portion of said camera, a lever element pivotally mounted on said first section adjacent to one corner thereof so as to extend substantially across the surface of said section and having flange means bearing against said first and second sections for slidably engaging the facing surfaces thereof; a flange at an extremity of said lever projecting downwardly through said slot, spring means mounted between said sections and divergingly biased so as to bear, respectively, against fixed means interposed between said sections and a bearing surface of said lever so as to move said downwardly projecting flange of the latter into contact with an edge of said slot, and handle means at an extremity of said lever opposite to said first-named extremity thereof for manually actuating said lever, said lever, when rotated in a direction against the bias of said spring, causing said downwardly projecting flange to move away from contact with said edge of said slot into contact with an opposite edge thereof, thereby also moving said downwardly projecting flange in a direction away from said fixed flange and enabling the mounting of said bracket on said camera.

2. A bracket for releasably mounting a flashgun including a principal housing and a reflector, on a band-like casing portion of a camera, said bracket being attached to the base of said flashgun and comprising a first rectangular plate section mounted on support means within said housing and adjacent to said base, a second smaller plate section having a flared extremity and a slot formed therein attached to said first section in underlying spaced relation thereto and also having a downwardly projecting fixed flange at a transverse extremity for engaging an external portion of said camera, a lever element pivotally mounted on said first section adjacent to one corner thereof so as to extend substantially across the surface of said section and having flange means bearing against said first and second sections for slidably engaging the facing surfaces thereof, a flange at an extremity of said lever projecting downwardly through said slot, spring means mounted between said sections and divergingly biased so as to bear, respectively, against fixed means interposed between said sections and a portion of said lever so as to move said downwardly projecting flange of the latter into contact with an edge of said slot, and handle means at an extremity of said lever opposite to said first-named extremity thereof for manually actuating said lever, said lever when rotated in a direction against the bias of said spring causing said downwardly projecting flange to move away from contact with said edge of said slot into contact with an opposite edge thereof, thereby also moving said downwardly projecting flange in a direction away from said fixed flange and enabling the mounting of said bracket on said band-like casing portion of said camera.

3. A mounting bracket, as defined in claim 2, wherein said first and second plate sections are unitary parts of a single elongated plate comprising a rolled-over extremity which provides said sections in spaced relation to one another, an inner surface of said rolled-over extremity constituting said interposed fixed means against which said spring bears.

4. For use with a camera including a casing and a band-like strip having undercut edges extending at least partially across one side of said camera with a recess formed adjacent to one of said edges, a bracket for mounting a flashgun including a principal housing and a reflector on said camera, said bracket comprising a first rectangular plate section mounted on support means within said housing, a second smaller plate section having a flared extremity and a slot formed therein attached to said first section in underlying spaced relation thereto and also having a downwardly projecting fixed flange at a transverse extremity for engaging an external portion of said camera, a lever element pivotally mounted on said first section adjacent to one corner thereof so as to extend substantially across the surface of said section and having flange means bearing against said first and second sections for slidably engaging the facing surfaces thereof; a flange at an extremity of said lever projecting downwardly through said slot, spring means mounted between said sections and divergingly biased so as to bear, respectively, against fixed means interposed between said sections and a projection of said lever so as to move said downwardly projecting flange of the latter into contact with an edge of said slot, and handle means at an extremity of said lever opposite to said first-named extremity thereof for manually actuating said lever, said lever when rotated in a direction against the bias of said spring causing said downwardly projecting flange to move away from contact with said edge of said slot into contact with an opposite edge thereof, thereby also moving said downwardly projecting flange in a direction away from said fixed flange and enabling the mounting of said bracket on said band-like strip of said camera.

5. Mounting means for releasably attaching a flashgun to a camera, comprising an elongated metallic strip having undercut opposite edge portions forming a part of the camera casing, a recessed entrance aperture formed in said camera casing adjacent to one of said edge portions, a mounting bracket attached to a housing of said flashgun and comprising a first rectangular generally planar plate section, a second smaller generally planar plate section having a flared extremity and a plurality of slots formed therein which is a folded-over extension of said first planar section in underlying spaced relation thereto, said second section also having an outwardly projecting fixed flange at said flared extremity for engaging an undercut edge portion of said strip of the camera, a generally flat-multi-contoured lever element pivotally mounted on said first section adjacent to one corner thereof so as to extend substantially across the surface of said section and having twice-angled flange means so turned as to be positioned between and bear against the inner facing surfaces of both sections for slidably engaging said surfaces, an outwardly turned flange at an extremity of said lever, movable therewith and projecting through one of said slots of said second section for engaging an edge portion of said strip of the camera opposite to that to be engaged by said fixed flange, spring means so mounted between said sections as to bear, respectively, against the inner surface of the folded-over bend of said sections and said flange of said lever which slidably engages said section inner surfaces and to pivot said flange of said lever into contact with a given edge of said slot through which it projects, and actuating handle means at an extremity of said lever opposite to that at which said last-named flange is located, said lever, when manually depressed in opposition to the bias applied thereto by said spring, causing said last-named flange to move into contact with an edge of said slot opposite to said first-named edge thus also increasing the spacing between said two engaging flange portions, whereby said first-named fixed flange may be inserted under one undercut edge portion of the camera strip, said movable flange of said lever may be inserted within said recess and under an opposite edge portion of said camera strip, and, when said lever is manually released, both said flanges are adapted to grip the edges of said strip, with the outer surface of said section, intermediate of said flanges, bearing on said strip, intermediate of said edges.

6. A photographic flashgun adapted to be detachably mounted on a camera, said flashgun comprising a generally rectangular housing, a bracket attached to the base of said housing for releasably mounting the flashgun on a camera so that the sides of said housing are substantially parallel with the sides of said camera, supplemental housing means integral with and projecting slightly outwardly from a flattened corner of said housing remote from said base providing a first planar bearing surface disposed at an acute angle relative to said sides of said housing and having a circular aperture formed therein leading into the interior of said housing, a generally parabolic reflector, a protective light-transmitting shield pivotally attached to said reflector at its open face, reflector mounting means integral with and projecting slightly outwardly from a portion of said reflector providing a second planar bearing surface adjacent to, but slightly offset from, the vertex of said reflector, said second planar surface being disposed at an acute angle relative to an optical axis, when established by said reflector and a flashlamp mounted therewithin, and having a circular aperture formed therein leading into the concavity of said reflector, a resilient gasket having a central aperture fixedly attached to said second bearing surface, said gasket having a small upstanding resilient flange at its outer edge mounted in a recess of said supplemental reflector means and projecting therefrom so as to constitute an engaging detent means, said first and second planar surfaces and said gasket being mutually superimposed, with said gasket at an intermediate position and said apertures in substantial alignment, a socket adapted to accept a flashlamp, said socket having a circular upper flange and a depending tubular portion of small diameter, said flange resting upon the inner surface of said reflector mounting means and said tubular portion being slidably mounted within said aligned apertures of said first and second bearing surfaces and said gasket, a plurality of recesses formed in the periphery of said circular flange for engagement by said detent means, spring means bearing divergingly against an inner wall of said housing and against means connected with said depending tubular socket portion, respectively, so as to draw said socket into said housing and provide a frictionally dampened rotatable mounting of said reflector relative to said angular supplemental housing surface, cap means biased upwardly by a spring centrally mounted in said socket providing both an electrical contact and a propulsion means for ejecting a flashlamp from said socket, a bell-crank pivotally mounted on the base of said socket one arm of which has a hooked, upwardly-disposed extremity for engaging a flange of said flashlamp and a second arm of which is biased by spring means into contact with a flashlamp ejecting button, the latter protruding through said housing and releasing said hooked extremity from the flashlamp flange when manually depressed, holding means within said housing for mounting a battery, and means providing electrical connections between said battery and socket and means adapted to connect with a pair of flash contacts of a camera.

7. A flashgun as defined in claim 6, wherein said supplemental housing means comprises a flattened corner of said housing.

8. A flashgun as defined in claim 6, wherein said light-transmitting shield is of a blue color adapted to absorb relatively long wavelengths of the visible spectrum.

9. A flashgun as defined in claim 6, wherein said housing, reflector, shield and socket are composed of plastic materials.

10. A flashgun as defined in claim 6, wherein said divergingly bearing spring means is of a generally semi-circular shape formed of flat spring stock so bent as to provide different portions in different planes.

11. A flashgun as defined in claim 6, wherein said cap means is a U-shaped metallic strip, its arms being slidably mounted in longitudinal apertures of said socket, and wherein said socket spring, capped thereby, is a spiral compression spring.

12. A flashgun as defined in claim 6, wherein said spring which engages an arm of said bell-crank and said electrical connection means between said socket and battery is a single unitary flexible metallic strip comprising relatively differently shaped portions.

References Cited by the Examiner
UNITED STATES PATENTS
3,018,707  1/62  Whittier _____ 95—11.5

NORTON ANSHER, *Primary Examiner.*
JOHN M. HORAN, *Examiner.*